Jan. 3, 1933.   A. OLDENBURG   1,892,997
ELECTRIC TOOL WITH AN ELECTRIC MOTOR MOUNTED IN THE HANDLE
Filed April 25, 1931
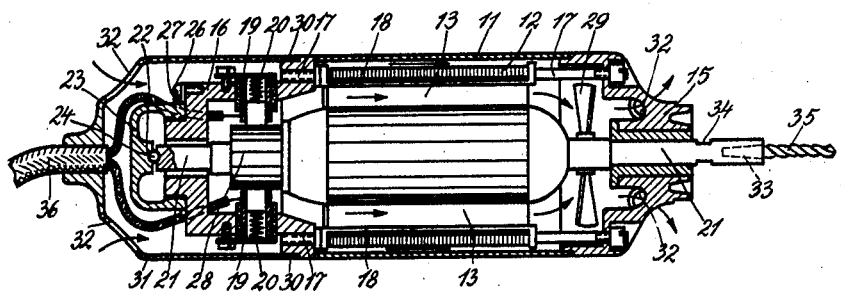
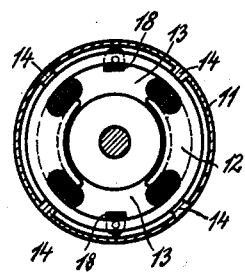 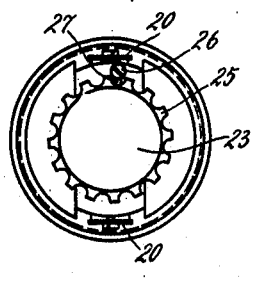

Patented Jan. 3, 1933

1,892,997

UNITED STATES PATENT OFFICE

ALFRED OLDENBURG, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ELECTRIC TOOL WITH AN ELECTRIC MOTOR MOUNTED IN THE HANDLE

Application filed April 25, 1931, Serial No. 532,734, and in Germany May 3, 1930.

My invention relates to an electric tool with an electric motor mounted in the handle.

In the motors mounted in the handle of small electric tools, such as drilling machines, hair cutting machines and the like, it is necessary to provide the motor with as good a cooling as possible to efficiently carry away the heat developed in same and to obtain a good efficiency of the motor. To fulfill these conditions, the bearing heads are, according to my invention, rigidly joined with the packet of laminations or stampings of the stator by means of clamps which embrace the packet of laminations, but leave sufficient space for cooling air to pass. The laminations are surrounded by an outer jacket, which is made so as to form at the same time the handle of the tool.

By using clamps embracing the packet of stator laminations, a particularly good utilization of the space is obtained, insofar as the bolts by which the bearing heads are attached to the clamps can be located close to the stator frame periphery, thus providing inside of the motor room for fans mounted on the motor shaft.

In the accompanying drawing, an example is illustrated for carrying out the invention.

Fig. 1 shows a longitudinal section,

Fig. 2 a cross section through the middle of the cylindrical casing 11, and

Fig. 3 is a left hand end view of the motor with the end cap 31 removed.

Referring to Figs. 1 and 2, the stator 12 of the motor is laminated as shown, the laminæ being clamped together at two diametrically opposite points by means of two elongated C-clamps 18, which run along the inner periphery of the stator. These clamps have stud bolts 17 at each end by which the two bearing heads 15 and 16 of the motor are fastened together with the stator to form a complete, rigid stator frame for the armature. The stator is surrounded by a jacket 11 which is spaced from the stator by ribs 14 (Fig. 2) so that an annular air chamber is formed between the jacket and the stator, this jacket being clamped at its ends between the two bearing heads, so that all of the aforesaid elements are securely held in their relative positions by the stud bolts 17 without any additional fastening means, outside of the nuts threaded onto the right hand bolts 17, and countersunk into bearing head 15. This arrangement very materially facilitates the quick assembly and dismounting of the motor. The bearing head 16 is provided with insulated guiding sleeves 19 for the brushes, which sleeves are covered with pivoted plates 20 capable of being turned sideways for removal of the brushes. To take the axial thrust of the motor shaft 21, the bearing head 16 is provided with a thrust bearing 22 containing a ball 24. This thrust bearing is carried by a cap 23 which is threaded onto the outer end of bearing head 16. The end of the motor shaft 21 rests against ball 24. To permit exact axial adjustment of the motor shaft, the rim of cap 23 is provided with a scalloped edge 25 normally in engagement with a pawl 27, held by a screw 26, as shown in Fig. 3. When the screw 26 is loosened and the pawl 27 lifted, the cap 23 can, according to requirements, be turned in one or the other direction, so that, if there are twenty teeth, axial clearance for the motor shaft can be adjusted to within the twentieth part of the pitch of the thread of the cap, i. e. an exceedingly short distance. The other end of motor shaft 21 carries a fan 29 inside of bearing head 15.

The flange of bearing head 16, located at its inner end, is provided with a thread 35 onto which is threaded a protecting hood 31 which covers the bearing head 16. This hood 31 is provided with openings 32 through which the air is drawn in by the fan 29. After passing through the annular space 13 between the laminated stator portion 12 and jacket 11, the air is discharged through similar openings 32 in the bearing head 15. As the bolts 17 are situated close to the inner peripheries of both bearing heads, the diameter of the fan 29 may be chosen relatively large, so that owing to the high speed of the motor, a strong current of air and thereby an efficient cooling can be obtained. Owing to C-clamps 18 running along the inner stator periphery between adjacent stator poles, the cooling channels 13 can be made relatively large, so that the cooling air only encounters a small resistance. Through a central opening in the protecting cover 31, the current-supplying cable 36 is led, the two conductors of which are connected to the guiding sleeves 19 for the brushes.

If the electric tool, built according to the invention, is to be used as a hand drilling machine or for other purposes, the tools, e. g. a drill 35, can be inserted in a tapering bore 33 in the motor shaft 21. This is as a rule only advisable with drills or tools having a small diameter.

If drills or other tools of larger diameter are to be employed, a chuck (not shown) is used, which may be placed on an external taper of the motor shaft. The tools may, of course also be made so that they can be placed directly on the external taper.

The invention can be applied to many purposes and uses, e. g. as a hand drilling machine for wood, as a drilling machine for dentists, as a machine for polishing finger nails etc., and possesses, owing to the high efficiency obtained through the good cooling of the motor, the advantage of being light in weight.

I claim as my invention:

1. In an electric hand tool an electric motor located in the tool handle, said motor having a laminated stator, and elongated C-clamps for clamping the stator laminæ together, said clamps running in axial direction along the inner stator periphery between adjacent stator poles.

2. In an electric hand tool an electric motor located in the tool handle, said motor having a laminated stator, and elongated C-clamps for clamping the stator laminæ together, said clamps running in axial direction along the inner stator periphery between adjacent stator poles, axially directed stud bolts fixed at the ends of said clamps, and bearing heads at the two stator ends attachable by said bolts to the stator to form therewith a rigid stator structure for the motor rotor.

3. In an electric hand tool an electric motor located in the tool handle, said motor having a laminated stator, and elongated C-clamps for clamping the stator laminæ together, said clamps running in axial direction along the inner stator periphery between adjacent stator poles, axially directed stud bolts fixed at the ends of said clamps, and bearing heads at the two stator ends attachable by said bolts to the stator to form therewith a rigid stator structure for the motor rotor, and an adjustable thrust bearing for the motor rotor threaded onto one of said bearing heads, and means for locking said bearing in adjusted position.

4. In an electric hand tool an electric motor located in the tool handle, said motor having a laminated stator, and elongated C-clamps for clamping the stator laminæ together, said clamps running in axial direction along the inner stator periphery between adjacent stator poles, axially directed stud bolts fixed at the ends of said clamps, and bearing heads at the two stator ends attachable by said bolts to the stator to form therewith a rigid stator structure for the motor rotor, and an outer jacket for said stator, spaced therefrom and forming the surface of the handle, and being clamped in position between said bearing heads, and a fan mounted on the motor armature and disposed in one of said bearing heads, for drawing cooling air through the space between the jacket and the stator.

In testimony whereof I affix my signature.

ALFRED OLDENBURG.